United States Patent

Sargisson

[11] 3,915,413
[45] Oct. 28, 1975

[54] VARIABLE AIR INLET SYSTEM FOR A GAS TURBINE ENGINE

[75] Inventor: Donald Farley Sargisson, Cincinnati, Ohio

[73] Assignee: General Electric Company, Lynn, Mass.

[22] Filed: Mar. 25, 1974

[21] Appl. No.: 454,751

[52] U.S. Cl. .............................. 244/53 B; 137/15.2
[51] Int. Cl.² ........................................ B64D 29/00
[58] Field of Search ........ 244/53 R, 53 B; 137/15.1, 137/15.2; 60/224, 226, 269, 270, 230, 231; 239/265.17, 265.29

[56] References Cited
UNITED STATES PATENTS

| | | | |
|---|---|---|---|
| 2,995,893 | 8/1961 | Morris et al. | 60/270 R |
| 3,059,878 | 10/1962 | Kerry et al. | 244/53 B |
| 3,208,383 | 9/1965 | Larson | 60/270 R |
| 3,477,455 | 11/1969 | Campbell | 137/15.1 |
| 3,495,605 | 2/1970 | Gunnarson et al. | 137/15.1 |
| 3,664,612 | 5/1972 | Skidmore et al. | 137/15.1 |

Primary Examiner—Trygve M. Blix
Assistant Examiner—Galen L. Barefoot
Attorney, Agent, or Firm—James W. Johnson, Jr.; Derek P. Lawrence

[57] ABSTRACT

A variable geometry inlet system is provided for a subsonic/supersonic gas turbine engine wherein a secondary inlet airflow is selectively ejected into a primary inlet airflow in order to augment the overall mass airflow to the engine and increase inlet pressure recovery. A plurality of foils are cooperatively disposed in rotatable connection with respect to a nacelle in order to modulate the secondary inlet airflow and match the velocity of the secondary airstream to that of the primary airstream thus reducing the mixing loss which would otherwise occur if the two streams commingled at different velocities. The primary and secondary inlet airstreams may also be maintained at a sufficiently high velocity to reduce the forward propagation of engine generated noise. The foils may also be rotated to define an outlet whereby a portion of the primary inlet airflow may be ejected overboard during supersonic operation to reduce aerodynamic drag as might otherwise result from a malfunctioning engine.

10 Claims, 8 Drawing Figures

VARIABLE AIR INLET SYSTEM FOR A GAS TURBINE ENGINE

BACKGROUND OF THE INVENTION

In general, this invention relates to a variable air inlet system for a gas turbine engine and, more particularly, to a variable air inlet system for a gas turbine engine wherein a secondary inlet airflow may be ejected into a primary inlet airflow in a controlled manner so as to match the velocities of the two commingling airstreams.

In gas turbine engines for use particularly in supersonic aircraft, great difficulty is encountered in designing an inlet system which will perform satisfactorily for all modes of operation. During the supersonic mode of operation the capture area of the engine inlet system must be correctly sized so that the "normal" shock wave system generally incurred in a supersonic inlet will terminate at the minimum or throat area of the inlet with all subsonic flow being in the downstream diverging or diffuser portion of the inlet. However, if the capture area of the inlet system is correctly sized for supersonic flight, then it may not be capable of providing the required mass airflow and pressure recovery, i.e. the ratio of the total energy in the moving airstream captured by the inlet system to the static pressure energy of the airflow at the engine intake during subsonic flight.

Thus, it has become necessary to provide variable geometry inlet systems wherein a secondary inlet airflow is selectively ejected into a primary inlet airflow in order to augment the overall mass airflow to the engine during those subsonic modes of operation when the engine operates at a high power setting such as during takeoff. Such variable geometry inlet systems have generally consisted of simple flap arrangements disposed about the inlet system nacelle wherein the flaps are rotated into the primary inlet airstream under the influence of the pressure differential existing between the primary airflow and the ambient airflow outside the nacelle. These types of secondary systems are generally inefficient because of the mixing losses and turbulence incurred between the primary and secondary airstreams due to the differential velocity between the two airstreams. Engine efficiency may be even further reduced if the pressure recovery in the inlet system is not sufficient.

In addition, due to the inability of these systems to match airflow velocities and, in particular, due to their inability to achieve controlled high subsonic secondary inlet airflow velocities, engine generated noise often "leaks out" through the secondary airflow inlets during the high power settings such as at takeoff, climb out and approach to landing.

For a supersonic inlet system, it may be necessary to provide, in addition to the variable secondary inlet, a variable outlet which may be operated during supersonic speed in the event of one engine malfunction or shutdown where it becomes necessary to eject a portion of the primary inlet airflow overboard in order to reduce the aerodynamic external, or spillage, drag as would otherwise result from a windmilling engine.

Therefore, it is a primary object of this invention to provide a variable air inlet system for a gas turbine engine wherein a secondary inlet airflow may be ejected into a primary inlet airflow in a controlled manner so as to match the velocities of the two commingling airstreams.

It is a further object of this invention to provide a variable air inlet system for a supersonic gas turbine engine wherein a secondary inlet airflow may be ejected into a primary inlet airflow in a controlled manner during subsonic operation so as to maximize the pressure recovery in the inlet.

It is also an object of this invention to provide a variable air inlet system for a gas turbine engine wherein a secondary inlet airflow may be controlled even at high subsonic velocities in order to block the propagation of engine generated noise through the secondary inlet.

It is also an object of this invention to provide a variable inlet system for a supersonic gas turbine a aircraft engine wherein a secondary inlet airflow may be selectively ejected into a primary inlet airflow during subsonic operation and a portion of the primary inlet airflow may be ejected overboard during supersonic operation in order to reduce aerodynamic drag as would otherwise result from a malfunctioning engine.

SUMMARY OF THE INVENTION

These and other objects and advantages will become clearly understood from the following detailed description and drawings, all of which are intended to be representative of, rather than in any way limiting on, the scope of invention. A variable air inlet system is provided for a gas turbine engine and comprises a nacelle extending upstream of the engine so as to define a primary inlet at the upstream end thereof for receipt of a primary inlet airflow. The nacelle includes at least one secondary air inlet upstream of the engine wherein the inlet has an outside inlet foil portion rotatably hinged with respect to the nacelle. There is also provided an inside inlet foil portion rotatably hinged with respect to the nacelle in spaced relation to the outside inlet foil portion. The exterior surface of the inside inlet foil portion fairs into the nacelle to provide a substantially smooth flow surface. The outside inlet foil portion can be rotated outwardly away from the inside inlet foil portion to define in cooperation therewith a secondary inlet passageway gradually diffusing inwardly and then rearwardly to direct a secondary inlet airflow inwardly and then rearwardly along the inside of the nacelle. Means are provided for continuously controlling the positions of the inside and outside inlet foil portions relative to each other so that the velocity of the secondary airflow ejected from the secondary passageway may be matched to the velocity of the primary airflow in order to reduce mixing losses.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1A is a cross-sectional view taken across the lines 1A—1A of FIG. 1.

FIG. 1B is a cross-sectional view taken across the lines 1B—1B of FIG. 1.

DESCRIPTION OF THE PREFERRED EMBODIMENT

Figure 1:
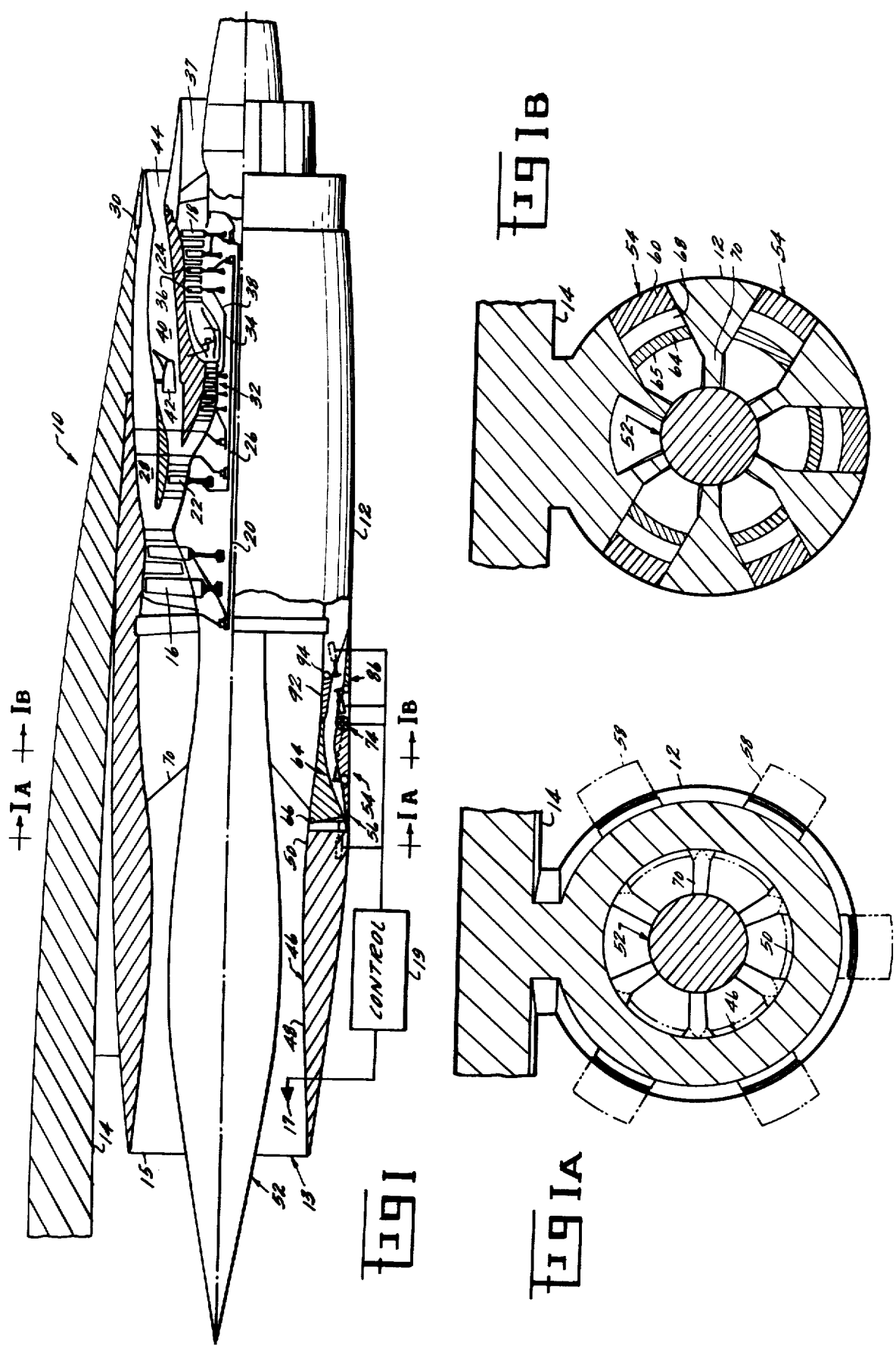
FIG. 1 is a partial cross-sectional view of a gas turbine engine embodying the variable air inlet system of this invention.

Referring to FIG. 1, the variable air inlet system of this invention is shown in conjunction with a gas turbine engine 10 which may be of the variable cycle type wherein the engine embodies a triple rotor in combination with means for modulating the airflow therethrough. The engine 10 is housed within an outer nacelle 12 which extends forwardly to define a supersonic primary inlet shown generally at 13 wherein the nacelle may be fixedly connected to the underlying surface of an airplane wing 14.

The engine 10 includes a front fan section 16 which is drivably connected to an aft turbine 18 through an interconnecting shaft 20. In downstream serial flow relation to the front fan section 16, there is provided an intermediate fan section 22 which is drivably connected to an intermediate turbine 24 through a second interconnecting shaft 26 concentric to the first shaft 20. Between the front and intermediate fan sections, there communicates an outer bypass duct 28 which extends rearwardly and terminates in an outer variable exhaust nozzle 30. In downstream serial flow relation to the intermediate fan section 22, there is provided a multi-stage core compressor 32 for pressurizing the airflow to a core combustor 34 which also receives an inlet flow of fuel from a source (not shown). The hot gases of combustion then exit from the combustor 34 through a core turbine 36 which drives the core compressor 32 through a third interconnecting shaft 38 concentric to the first and second shafts 26, 20. The exhaust gases thereafter drive the intermediate turbine 24 and aft turbine 18 exiting from the core through an exhaust nozzle 37.

Between the outer bypass duct 28 and core, there is provided an intermediate bypass duct 40 which receives a portion of the airflow exiting from the fan section 22 and then directs the airflow rearwardly so as to exit through an intermediate variable exhaust nozzle 44. There is also included a bypass burner 42 which may be ignited during transonic climb and acceleration and which may remain ignited during supersonic cruise when the fuel flow and thrust augmentation are cut back from their previous levels during transonic flight. During subsonic cruise and climb all three exhaust nozzles 44, 37 and 30 would remain open with no burning in the bypass burner 42. The triple rotor gas turbine engine herein described is only the preferred engine for the variable air inlet system of this invention, and other types of gas turbine engines such as conventional turbofan, turboprop and turbojet engines could also be suitable for use with the variable inlet system of this invention.

The supersonic primary inlet 13 provides a primary airflow to the engine 10 and includes an interior wall member 46 which has a forward converging portion 48 connecting to an aft diverging portion 50 which is the diffusing portion of the inlet 13. Centrally disposed within the interior wall member 46 there is provided a translatable center plug or spike 52 which is controlled in a well known manner through a primary inlet airflow Mach sensor 17 and control 19 to vary the available cross-sectional flow area and throat position as a function of the inlet airflow Mach number. Mach sensor 17 and control 19 may be of the type disclosed in U.S. Pat. No. 3,533,238. In the supersonic cruise mode of operation, as shown in FIG. 1, the centerplug 52 is in the fully retracted position and the cross-sectional area of the inlet 13 at the leading edge 15 is equal to the airflow capture area required for supersonic flight. In addition, the axial position of the centerplug 52 is located so that the leading edge of the spike produces a conical shock wave that intersects the leading edge 15 of the nacelle 12. The supersonic primary inlet 13 operates in a conventional manner as is well known in the art.

Figure 2:
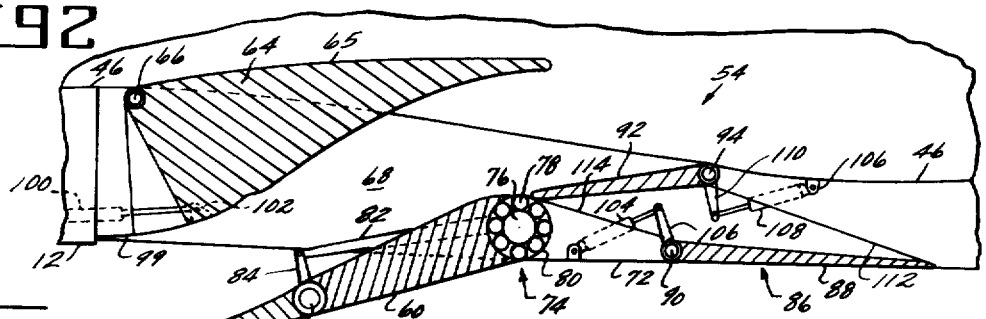
FIG. 2 is a cross-sectional view of a portion of the variable inlet system of FIG. 1 in a different mode of operation.
Figure 3:
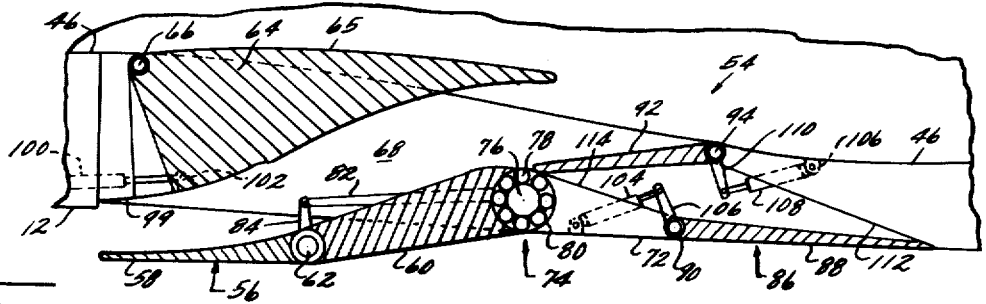
FIG. 3 is a cross-sectional view of a portion of the variable inlet system of FIG. 1 in still another mode of operation.
Figure 4:
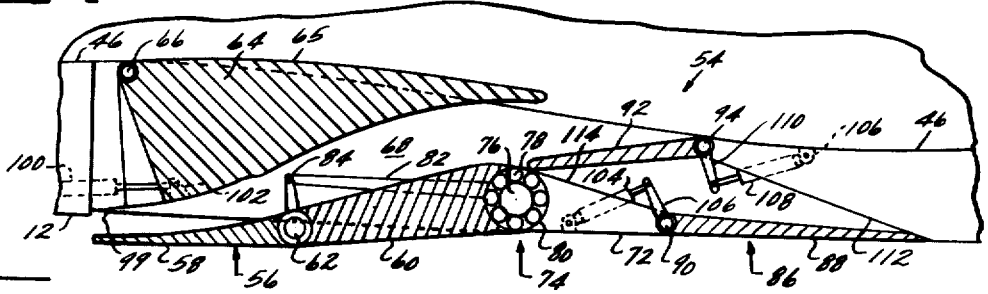
FIG. 4 is a cross-sectional view of a portion of the variable inlet system of FIG. 1 in still another mode of operation.

The variable air inlet system of this invention includes a plurality of circumferentially spaced apart secondary variable air inlets, one of which is shown generally at 54. Each variable air inlet 54 is stationed upstream from the front fan section 16 and provides a secondary airflow which commingles with the primary airflow in a manner to be described in the following discussion. Each inlet 54 includes an outside foldable inlet foil portion 56 comprising a forward foil member 58 rotatably hinged at 62 to an aft foil member 60. There is also provided an inside inlet foil portion 64 rotatably hinged at 66 to the interior wall member 46 and rotatably controlled through an actuator 100. The foil portion 64 also includes an exterior surface 99 which fairs into the inside of nacelle 12 to provide a smooth flow surface as well as sealing engagement between the nacelle and foil portion 64. The foil portions 56 and 64 cooperate, as best shown in FIGS. 2 through 4, to define a secondary air inlet passageway 68, the function of which will be made obvious from the following discussion.

Between the spaced apart secondary air inlets 54, there are provided longitudinal strut members 70, as best shown in FIG. 1A and 1B, wherein the struts 70 define a continuation of the engine nacelle 12 and support a transverse support member 72 which in turn pivotally receives the aft foil members 60 of the outside foldable inlet foil portions 56. Each foil member 60 is connected to the support 72 by a power hinge 74 of a type well known in the art which may include a central sun gear 76 engaged to a plurality of planetary gears 78 which in turn are disposed within ring gear 80 fastened to the foil member. The power hinge 74 may include a small motor (not shown) adjacent the sun gear 76 wherein the motor is controlled to rotate the sun gear as a function of the primary inlet airflow Mach number by an input signal received from the control 19. The foil member 60 is then rotated through the interconnecting ring gear 80 and planetary gears 78. The sun gear 76 may also drive a link 82 which rotatably connects to a lever arm 84 extending in fixed connection from the forward foil member 58.

Aft of the support member 72 there is provided a variable air outlet 86 comprising an outside outlet foil portion 88 rotatably hinged at 90 to the support member 72 together with an inside outlet foil portion 92 rotatably hinged at 94 to the interior wall 46. The outlet foil 88 cooperates with an interior face 114 of the support member 72 together with the inside surface 65 of the inlet foil portion 64 to define the outside, gradually diverging face of an outlet passageway 96 (FIG. 6) through which a portion of the primary inlet airflow may be selectively ejected under certain operating conditions to be subsequently described. The inside face of the outlet passageway is defined by the foil member 92 in cooperation with an outwardly diverging wall member 112 which interconnects the outer nacelle 12 with the interior wall 46. The outlet foil 88 may be rotated about the hinge 90 by an actuator 104 which rotatably connects to a pivot arm 106 extending from the foil 88. In like manner the inner foil 92 may be rotated about the hinge 94 by an actuator 108 which rotatably connects to a pivot arm 110 extending from the foil 92. The actuators 100, 104 and 108 may be controlled as a function of the primary inlet airflow Mach number by an input signal received from the control 19.

As previously discussed, the capture area of the primary air inlet 13 of the engine 10 is correctly sized for only the supersonic cruise condition and the inlet 13 would not be capable of provding the required mass airflow for best efficiency during takeoff and subsonic flight. It thus becomes necessary to provide a secondary airflow source for augmenting the airflow to the engine during takeoff and high engine power settings in the subsonic mode of operation. As is well known in the art, the secondary systems have generally consisted of simple flap arrangements that are rotated into the primary airstream under the influence of the pressure differential existing between the primary airflow and the ambient airflow outside the nacelle. These types of secondary systems are generally inefficient because of the mixing losses and turbulence incurred between the primary and secondary airstreams due to the differential velocity between the two airstreams. Efficiency may be even further reduced if the pressure recovery at the intake to the engine compressor is not sufficient.

Referring now to FIG. 2, there is shown the mode of operation for the variable air inlet system of this invention which is assumed during takeoff and preferably maintained until the primary inlet airflow reaches a speed of approximately Mach 0.35. During the takeoff mode of operation, the centerplug 52 is extended forward and the three exhaust nozzles 30, 44, and 37 are set to area values that permit a maximum mass airflow through the engine 10. To provide the maximum secondary inlet airflow, the outside foil portion 56 is rotated outwardly in a counter-clockwise direction by the power hinge 74 which also operates, through the interconnecting link 82, to rotate the forward foil member 58 to its extreme counter-clockwise open position. In like manner, the inside inlet foil portion 64 is rotated about the hinge 66 by the actuator 100 so as to assume its extreme counter-clockwise open position. The outside foil portion 56 co-acts with the inside outlet foil portion 92 to define the outside surface of the secondary inlet passageway 68. The interior surfaces of the foil members 58, 60 and the foil portion 92 cooperate with the exterior surface 99 of the inner foil portion 64 so that the secondary inlet passageway 68 gradually diffuses inwardly and then rearwardly in order to direct the secondary inlet airflow inwardly and then rearwardly along the interior wall 46. In this manner, the secondary airflow may be ejected in substantially the same direction as the primary airflow so as to provide a minimum of turbulence when the two streams commingle at the trailing edge of the inside foil portion 64. As is readily apparent, the inside foil portion 92 and the outside foil portion 88 are rotated into their respective closed positions so as to block any outward airflow from the primary airstream.

Referring now to FIG. 3, there is shown the mode of operation assumed for the variable air inlet system of this invention during low subsonic primary airflow inlet speeds in the approximate range of Mach 0.35 to Mach 0.75. During this mode of operation, the position of the inside inlet foil portion 64 is continuously controlled through the actuator 100 together with the position of the forward foil member 58 and aft foil member 60 so as to modulate the secondary airflow through the passageway 68 in a manner which operates to match the velocity of the secondary airflow to that of the primary airflow.

The control 19 for the power actuators and power hinge is preferably made responsive to the velocity of the primary inlet airflow as monitored by the inlet Mach sensor 17, so as to incrementally adjust the positions of the foil portion 64 and the foil members 58 and 60 to compensate for changes in the velocity of the primary airflow. It would also be possible to make the control 19 responsive to other engine or aircraft flight parameters such as rotor speeds and/or aerodynamic pressure. In this manner, the velocity of the secondary airflow ejected from the passageway 68 may be matched to the velocity of the primary airflow so as to insure that the aerodynamic mixing of the primary and secondary airflows occurs at equivalent Mach numbers, thus reducing mixing losses and distortion which might otherwise occur and result in lowered engine efficiency.

Referring now to FIG. 4, there is shown a mode of operation for the variable inlet system of this invention assumed during high subsonic primary airflow inlet speeds in the approximate range of Mach 0.75 to Mach 0.90. This operational mode could also be used for extended subsonic flight and possibly during aircraft acceleration from Mach 0.90 to Mach 1.20. During this mode of operation, the aft foil member 60 is controlled to rotate through a limited range about the power hinge 74 so as to cooperate with the inside foil portion 64 in order to further modulate the secondary airflow through the passageway 68, thus continuing to match the ejected velocity of the secondary airflow with that of the primary airflow. During the high subsonic and/or transonic mode of operation, as depicted in FIG. 4, it will be appreciated that the outer exhaust nozzle 30 is progressively closed and that the burner 42 in the intermediate bypass duct 40 is ignited.

Figure 5:
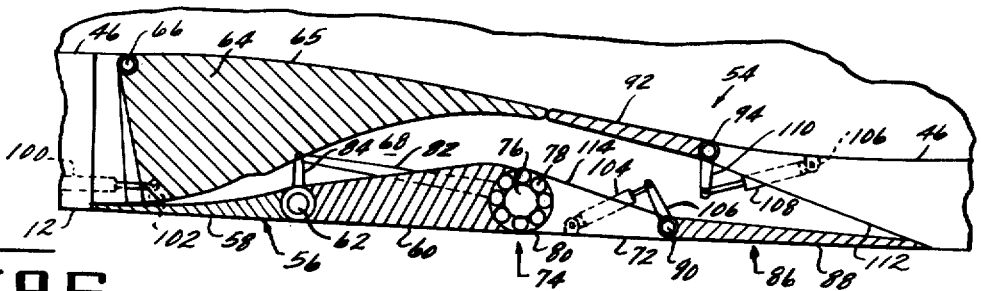
FIG. 5 is a cross-sectional view of a portion of the variable inlet system of FIG. 1 in still another mode of operation.

Referring now to FIG. 5, there is shown the mode of operation assumed by the variable air inlet system of this invention during supersonic cruise when the inlet centerplug 52 is retracted to the position as shown in FIG. 1 so as to provide the required captured inlet area for best efficiency. During this mode of operation, the secondary inlet airflow is not required, and hence the outside inlet foil portion 56 is rotated into its extreme clockwise position so as to close the secondary inlet airflow passageway, while at the same time fairing into the nacelle 12 to provide a smooth aerodynamic continuation thereof. In like manner, the inside inlet foil portion 64 is rotated also clockwise while the inside outlet foil portion 92 is rotated a limited distance outwardly about the hinge 94 in a clockwise direction so as to engage the trailing edge of the foil 64. In this manner, the foil portion 64 fairs into the foil portion 92 so as to provide a smooth aerodynamic continuation of the interior surface 46.

Figure 6:
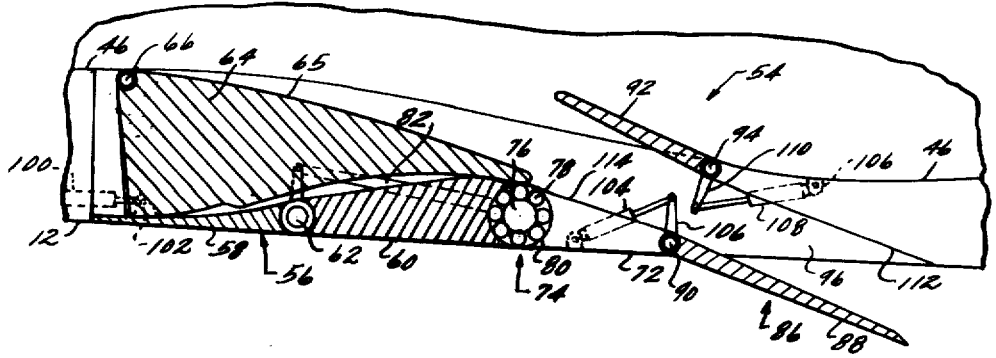
FIG. 6 is a cross-sectional view of a portion of the variable inlet system of FIG. 1 in still another mode of operation.

Referring now to FIG. 6, there is shown the mode of operation which may be assumed by the variable air inlet system of this invention during an engine malfunction or shutdown at supersonic speed where it becomes necessary to eject a portion of the primary inlet airflow overboard in order to reduce the aerodynamic drag as would otherwise result from a windmilling engine. In this manner, the velocity of the primary inlet airstream may be controlled until the aircraft velocity can be reduced below supersonic speed. As can be readily seen from FIG. 6, the outside foldable inlet foil portion 56 remains closed while the inside inlet foil portion 64 is rotated to its extreme clockwise position wherein it engages the interior face 114 of the support member 72. The outside outlet foil portion 88 is also rotated in a clockwise direction about the hinge 90 by the actuator 104 so as to cooperate with interior face 114 and inside inlet foil portion 64 to define an outwardly diverging faired surface. In like manner, the inside outlet foil portion 92 is rotated about the hinge 94 by the actuator 108 to its extreme clockwise position so as to co-act with the interconnecting wall member 112 to define a second outwardly diverging faired surface which, in cooperation with the foils 64, 88 and support 72, define the outlet passageway 96. Thus a portion of the primary inlet airflow may be ejected through the outlet passageway 96 so as to reduce the drag which would otherwise be incurred should the engine fail during supersonic flight.

Therefore, while a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What is claimed is:

1. A variable air inlet system for a gas turbine engine comprising:
a nacelle extending upstream of the engine so as to define a primary inlet at the upstream end thereof for receipt of a primary inlet airflow;
at least one secondary air inlet in the nacelle upstream of the engine including an outside inlet foil portion rotatably hinged at a first hinge point to the nacelle, together with an inside inlet foil portion rotatably hinged at a different hinge point to the nacelle in spaced relation to the outside inlet foil portion such that the exterior surface of the inside inlet foil portion fairs into the nacelle to provide a substantially smooth flow surface and the outside inlet foil portion can be rotated outwardly away from the inside inlet foil portion to define in cooperation therewith a secondary inlet passageway gradually converging inwardly and then rearwardly to direct a secondary inlet airflow inwardly and then rearwardly along the inside of the nacelle, and means for continuously controlling the positions of the inside and outside inlet foil portions relative to each other so that the velocity of the secondary airflow ejected from the secondary passageway may be matched to the velocity of the primary airflow in order to reduce mixing losses.

2. The variable air inlet system of claim 1 wherein the outside inlet foil portion is foldable having a forward foil member rotatably hinged to an aft foil member such that during low subsonic speeds the position of the forward and aft foil members are continuously controlled together with the position of the inside inlet foil portion so as to modulate the velocity of the secondary airflow through the passageway and during high subsonic speeds the position of the forward and aft foil members are continuously controlled, together with the position of the inside inlet foil portion so as to continue to modulate the velocity of the secondary airflow through the passageway in order to insure that the aerodynamic mixing of the primary and secondary airflows occurs at substantially equal velocities during both low and high subsonic speeds.

3. The variable air inlet system of claim 2 wherein the secondary air inlet includes a transverse support member in spaced relation from the upstream and downstream ends thereof and the upstream side of the support member pivotally receives the aft foil member of the outside foldable inlet foil portion and the downstream side of the support member pivotally receives an outside outlet foil portion which cooperates with an inside outlet foil portion rotatably disposed relative to the nacelle to provide an outlet passageway through which a portion of the primary inlet airflow may be selectively ejected overboard.

4. The variable air inlet system of claim 3 wherein there are provided a plurality of circumferentially spaced apart secondary inlets with longitudinal struts therebetween wherein the struts define a continuation of the nacelle and support the transverse support member.

5. The variable air inlet system of claim 3 wherein the primary inlet is of the supersonic type having an interior wall member with a forward converging portion connecting to an aft diverging portion together with a translatable centerplug centrally disposed within the interior wall and the outside outlet foil portion cooperates with an interior face of the support member together with the inside surface of the inside inlet foil portion to define the outside gradually diverging face of the outlet passageway with the inside face of the outlet passageway defined by the inside outlet foil portion in cooperation with an outwardly diverging wall member which interconnects the nacelle with the interior wall.

6. The variable air inlet system of claim 3 wherein the inside inlet foil portion, the inside outlet foil portion and the outside outlet foil portion are rotated by respective actuators and the outside foldable inlet foil portion is rotated by a power hinge which also connects through linkage means to the forward foil member in order to rotate the forward foil member simultaneous with and relative to the aft foil member and wherein the actuators and power hinge for the inlet foil portions are controlled as a function of the primary inlet subsonic airflow Mach number by a control which receives a signal from a primary inlet airflow Mach sensor with the outlet foil portions selectively opened at supersonic primary inlet airflow speeds to control aerodynamic drag.

7. The variable air inlet system of claim 2 wherein the nacelle includes an interior wall member spaced inward therefrom together with a transverse support member extending across the secondary inlet in spaced relation from the upstream and downstream ends thereof wherein the upstream side of the support member pivotally receives the aft foil member with the downstream side of the support member pivotally receiving an outside outlet foil portion which cooperates with an inside outlet foil portion rotatably connected to the interior wall member to provide an outlet passageway through which a portion of the primary inlet airflow may be selectively ejected overboard, and whereby the inside inlet foil portion is rotatably connected to the interior wall member in spaced apart opposing relation to the inside outlet foil portion such that the two inside foil portions can be rotated into engaging relation and thus block both the secondary inlet and outlet airflows.

8. The variable air inlet system of claim 7 wherein the primary inlet is of the supersonic type whereby the interior wall member includes a forward converging portion connecting to an aft diverging portion together with a translatable centerplug centrally disposed within the interior wall.

9. The variable air inlet system of claim 7 wherein the inside inlet foil portion, the inside outlet foil portion and the outside outlet foil portion are rotated by respective actuators and the outside foldable inlet foil portion is rotated by a power hinge which also connects through linkage means to the forward foil member in order to rotate the forward foil member simultaneous with and relative to the aft foil member wherein the actuators and power hinge for the inlet foil portions are controlled as a function of the primary inlet subsonic airflow Mach number by a control which receives a signal from a primary inlet airflow Mach sensor with the outlet foil portions selectively opened at supersonic primary inlet airflow speeds to control aerodynamic drag.

10. The variable air inlet system of claim 7 wherein the interior surfaces of the foil members of the outside inlet foil portion together with the inside outlet foil portion cooperatively define the outside face of the secondary inlet passageway with the inside face thereof defined by the exterior surface of the inside inlet foil portion, and wherein the outside outlet foil portion cooperates with the interior face of the support ring together with the inside surface of the inside inlet foil portion to define the outside gradually diverging face of the outlet passageway with the inside face thereof defined by the inside outlet foil portion in cooperation with an outwardly diverging wall member which interconnects nacelle and interior wall.

* * * * *